United States Patent
Xia et al.

(10) Patent No.: US 9,906,718 B2
(45) Date of Patent: Feb. 27, 2018

(54) BIOMIMETIC INTEGRATED OPTICAL SENSOR (BIOS) SYSTEM

(71) Applicant: Luminit LLC, Torrance, CA (US)

(72) Inventors: Winston X. Xia, Long Beach, CA (US); Fedor I. Dimov, Redondo Beach, CA (US)

(73) Assignee: Luminit LLC, Torance, CA (US)

(*) Notice: Subject to any disclaimer, the term of this patent is extended or adjusted under 35 U.S.C. 154(b) by 370 days.

(21) Appl. No.: 14/701,103

(22) Filed: Apr. 30, 2015

(65) Prior Publication Data
US 2017/0041534 A1 Feb. 9, 2017

Related U.S. Application Data

(60) Provisional application No. 61/986,535, filed on Apr. 30, 2014.

(51) Int. Cl.
*H04N 5/232* (2006.01)
*H04N 5/33* (2006.01)
*H04N 5/225* (2006.01)
*G02B 6/06* (2006.01)
*G06N 3/063* (2006.01)

(52) U.S. Cl.
CPC ....... *H04N 5/23238* (2013.01); *H04N 5/2251* (2013.01); *H04N 5/2257* (2013.01); *H04N 5/33* (2013.01); *G02B 6/06* (2013.01); *G02F 2203/055* (2013.01); *G02F 2203/11* (2013.01); *G06N 3/063* (2013.01)

(58) Field of Classification Search
CPC .... H04N 5/23238; H04N 5/2251; H04N 5/33; H04N 5/2257
See application file for complete search history.

(56) References Cited

U.S. PATENT DOCUMENTS

2006/0276713 A1* 12/2006 Maier ............... A61B 5/14532
                                                                   600/473
2015/0109623 A1* 4/2015 Abdulhalm ........ G01B 9/02004
                                                                   356/479

* cited by examiner

*Primary Examiner* — David Porta
*Assistant Examiner* — Mindy Vu
(74) *Attorney, Agent, or Firm* — Husch Blackwell LLP

(57) ABSTRACT

The subject invention includes a biomimetic integrated optical sensor system, based on the integration of a wide field-of-view (WFOV) miniature staring multi-aperture compound eye with a high-speed, low-cost, polarization and spectral selective liquid crystal (LC) filter array, a MWIR focal plane array (FPA), and a neural network processor.

Figure 1:
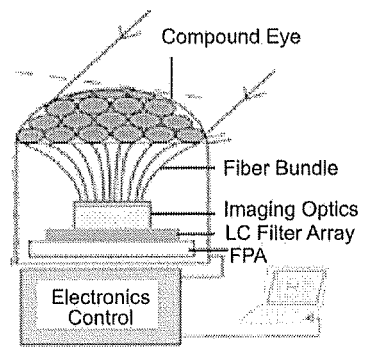

6 Claims, 1 Drawing Sheet

BIOMIMETIC INTEGRATED OPTICAL SENSOR (BIOS) SYSTEM

GOVERNMENT RIGHTS STATEMENT

The United States Government may have certain rights to this invention under Air Force Contract No: FA8651-13-M-0086.

FIELD OF THE INVENTION

The present invention relates to the art of optical imaging and sensing. In particular, the present invention relates to biologically-inspired wide field-of-view (FOV) spectral and polarization imaging sensors in mid wave infrared (MWIR, 3-5 microns) region.

BACKGROUND OF THE INVENTION

Prior art optical imaging sensors, which are based on either CCD or CMOS focal-plane array sensors, perform well in many imaging applications, but have certain drawbacks for applications that require high sensitivity to motion and high-speed extraction of certain image features such as object edges There is a need for a novel advanced imaging sensor concept that samples all of the information in the radiation field, taking inspiration from biological systems. The sensor system should use most if not all of the information in the light field, including spectral, temporal, polarization, and intensity for detailed object shape, for applications enabling autonomous behavior, including egomotion determination, to aid in navigation; as well as target detection, recognition, ranging, and tracking. The integrated system design should include information processing at a fundamentally integrated level with the optics and transduction. The system should also conform to shapes with smooth contours such as airframes, and have a wide field of view (FOV≥π steradians) to allow acquiring wide FOV motion patterns using the idea of elementary motion detectors as hypothesized in neural superposition eyes (e.g., in insects and crustaceans). The system should perform spectral (mid-wave infrared (MWIR) from 3 to 5 µm and long-wave infrared (LWIR) from 8 to 12 µm), temporal, and direction sensing relative to the celestial polarization pattern. This capability would enable egomotion determination involving local motion detection, which enables global motion detection (optic flow), as well as target detection and camouflage-breaking involving target-background discrimination via motion detection for moving targets as well as spectral, shape, and polarization discrimination.

Both CCD and CMOS focal-plane array sensors are commonly used and perform well in many imaging applications, but they have certain drawbacks for applications that require high sensitivity to motion and high-speed extraction of certain image features such as object edges. The biologically inspired, or biomimetic, engineering approach was embraced to take advantage of proven biological "designs" found in the animal kingdom and to then adapt salient aspects of these into more capable designs. An example is the artificial apposition compound eye that uses one pixel per microlens on the two dimensional (2D) flat structure. An improvement of the performance of artificial apposition compound eyes is bionically inspired by the eye of the house fly. The artificial neural superposition compound eye uses a set of 3×3 pixels in the footprint of each microlens. Color imaging and an increase of the signal-to-noise ratio have been demonstrated using a redundant sampling between these pixels. However, the main disadvantage of the apposition principle, the low image resolution, remains. Furthermore, neither polarization nor spectral detection is involved.

SUMMARY OF THE INVENTION

The present invention, the applications of which include, but are not limited to, autonomous behavior for egomotion determination, navigation, target detection, recognition, ranging, and tracking, is a biomimetic integrated optical sensor system, based on the integration of a wide field-of-view (WFOV) miniature staring multi-aperture compound eye with a high-speed, low-cost, polarization and spectral selective liquid crystal (LC) filter array, a MWIR focal plane array (FPA), and a neural network processor.

The system of the subject invention, is based on the neural superposition compound eye of insects. The subject invention is an integration of a wide field-of-view (FOV) miniature staring multi-aperture compound eye with a high-speed, low-cost, polarization and spectral selective liquid crystal (LC) filter array, a focal plane array (FPA), and a neural network processor (FIG. 1). The integrated modular design of the subject system uses most if not all of the information in the light field, including spectral, temporal, polarization, and intensity for detailed object shape, for applications enabling autonomous behavior, including egomotion determination, to aid in navigation; as well as target detection, recognition, ranging, and tracking. The high-speed sensor, detects targets in its hemispherical FOV (90° elevation and 360° azimuth). By sensing the optical flow across its elements, the sensor determines the location and velocity of the target, tracking it instantly to its direction of impact. The curved 3D compound eye design allows the system to conform to shapes with smooth contours such as airframes, and have a wide field of view (FOV~2π steradians) to allow acquiring wide FOV motion patterns. A fast electro-optically (EO) tunable LC filter array integrated with the MWIR/LWIR FPA allows high-speed, spectral (3 to 5 µm and 8 to 12 µm), polarization (4 full Stokes components), and detailed object shape detection. The multi-aperture sensors are directly hard-wired to high-speed neural net processors in the module so that the data is produced almost instantly (no need to send it to a separate processor). Thus, space, weight, and power are saved and targets are detected more precisely and reliably due to the polarization and spectral signature detection with constant sensor sensitivity over the whole hemispherical FOV.

CONCISE DESCRIPTION OF THE DRAWINGS

FIG. 1 shows a multi sensor component of the sensor system of the subject invention.

Figure 2A:
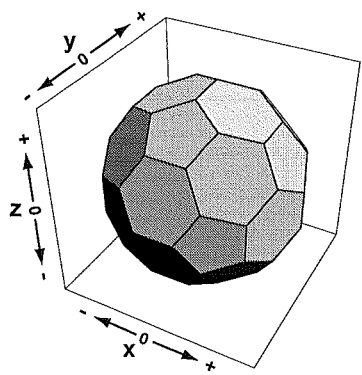
Figure 2B:
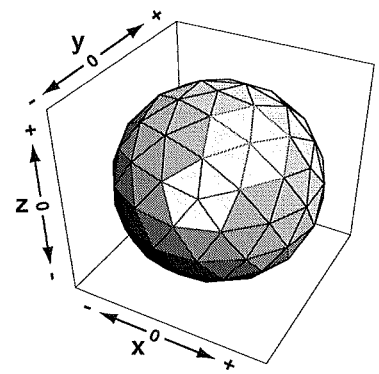

FIGS. 2(a) and 2(b) shows the analytical model used to design the fly-eye imaging optical elements.

Figure 3:
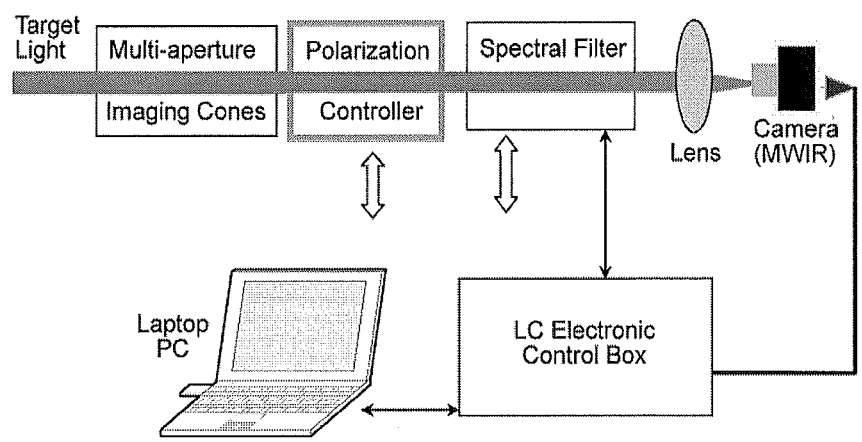

FIG. 3 is a schematic showing assembly of the apparatus of the subject invention.

DETAILED DESCRIPTION OF THE VARIOUS EMBODIMENTS

The system design includes four key components: (1) wide field-of-view (FOV) miniature staring multi-aperture compound eye with microlens arrayed fiber bundle, (2) polarization and spectral selective liquid crystal (LC) filter array, (3) focal plane array (FPA), and (4) neural network electronics processor. A microcomputer may be used for image processing. The multi-aperture compound-eye is a fundamentally new approach to overcoming the speed and FOV limitations of classical wide FOV electro-optical systems. The concept in achieving its unique performance advantage is as follows. By applying fuzzy metrology (a method of extracting specific data from a set of fuzzy [probabilistic] input to the compound-eye sensor, angular resolution up to two magnitudes better than the classical limit of 1/N is achieving, where N is the number of detector elements. Because the defuzzification of data and moving object detection are performed by an electronic processor based on an artificial neural network (ANN), the sensor is extremely fast. This compound-eye sensor forms a 180° hemispherical FOV image of a moving object with resolution somewhat like that of a half-toned image, which is similar to a fly's vision. With a small overlap in the angular responses of the cone elements, the image can be optically smoothed out before any electronic processing.

Multi-Aperture Design, FIO Distribution, and Angular Response

The number of fly-eye imaging optical (FIO) elements should be minimized so that subsequent data processing is fast. On the other hand, more elements increase angular resolution. These two parameters should be traded off based on the simulation studies, also taking into account the size and cost of available IR sensor arrays. Once the number of FIOs is defined, the input aperture size of these FIOs can be determined by the radius of the dome, having them cover the area of the dome with the smallest dead-zone, maximizing light collection efficiency. For a given number of FIOs, the larger the dome radius, the better the light collection and the higher the detection sensitivity. The angular response of these FIOs is independently defined by the specific shape of the FIOs.

The design started with construction of a geodesic domed surface consisting of interlocking polygons. Each FIO is placed at an intersection called a vertex. The coordinates of the vertices can be calculated for the FIO distribution using the basic buckyball surface. This surface and its vertex coordinates are shown in FIG. 2(a)+2(b). To increase the density of FIO distribution on a buckyball surface, each hexagon and pentagon can be triangulated in steps. A once-triangulated (i.e., first-order) buckyball is shown in FIG. 2(b). This process is repeated to increase the number of FIOs sufficient for the design.

To determine the angular response and study the image forming characteristic of this multi-aperture system, the coordinates of the FIO vertices can be transformed and imported into Zemax optical design software. In Zemax, the orientation of each FIO is computed in Zemax macro language. In this model, all FIO entrance apertures were oriented outward radially relative to the center of the buckyball.

Signal-to-Noise Ratio and Detection Range Estimation

Using established radiometry methodology the dependence of the detection distance on the size of imaging cone elements was calculated based on the estimation for signal-to-noise ratio of the output signal from the detector on which the received optical signal is concentrated by the imaging cone. The detection distance value is determined based on the statistical calculation of radiation within the MWIR window of 3-5 μm from a target (e.g., an abstract rocket engine plume) taken as a blackbody with a temperature of T=1500 K and emissivity of 1. The power of radiation emitted from A=1 m² of the blackbody surface is calculated in accordance with the Stefan-Boltzmann law:

$$P_{emitted} = \sigma \epsilon T^4 A = 28.8 \times 10^4 \text{ W}, \quad (3\text{-}1)$$

where $\sigma = 5.7 \times 10^{-8}$ W/m² K⁴, and $\epsilon = 1$ is emissivity. Around 40% of the energy (for a body at T=1500 K) is radiated within the 3-5 μm band.

To calculate the flux incident onto the imaging cone detector, the classic radiometric performance equation methodology is implemented. The radiation from the rocket exhaust goes into a 4π sr solid angle, while the imaging cone (remotely placed at distance L) is collecting only its $D^2/16L^2$ portion. Optical loss is taken as 50% (which is a good estimate for the imaging cone optics). Thus, the total power/infrared flux collected by the imaging cone is:

$$P = (0.5)(0.4)\sigma T^4 A D^2/16L^2 \sim 0.36/L^2 \text{ (W/m}^2\text{)} \quad (3\text{-}2)$$

for values D=10 mm, A=1 m², and T=1500 K; L is expressed in meters (also taken into account is that only 40% of radiation is actually registered in the 3-5 μm band). This flux detected in the photodetector creates a signal voltage/current, while at the same time the detector itself has some electrical noise. Noise/clutter from the sky with its maximum luminance in visible or other sources of noise (such as a torch), that could be present nearby but are stationary, are not included here as they will be suppressed by signal processing. Optimum design of the system performance includes consideration of Signal to Noise Ratio (SNR) for the photodetector. The SNR for a photodetector is determined as: SNR=P/P$_{noise}$, where P is a flux from Eq. (3-4), and P$_{noise}$ is the noise within the bandwidth of signal processing (100-1000 Hz). For these calculations P$_{noise}$=NEP $\Delta f^{1/2}$~0.2 nW was used, where NEP is noise equivalent power. This NEP value is determined through the formula NEP=$\sqrt{A_d}$/D$_\lambda$*, where D*=$10^9$ cmHz$^{1/2}$/W is detectivity for the J14 detector (PbSe photoresistive detector) and A$_d$ is the area of the detector itself (1 mm²). The frequency band Δf of the electrical signal was taken as of 1000 Hz, which fits requirements for the IR signatures of targets that are transients of 2 ms and longer). The detection distance (when the required SNR value is reached) depends on the individual aperture size/diameter; to reach SNR=6 at a distance of 4 km, the entrance optical aperture is >3 cm² (~20 mm diameter). Calculations of MWIR laser detection with such an aperture and the PbSe detector in the detector with NEP=$10^{-14}$ W/Mz$^{1/2}$ show that emission of 1 mW laser pointer with divergence of 1 mrad directed toward the system will be detected (with SNR>6:1) at distance of 10 km (far exceeding the 4 km required by the typical military applications). A hostile fire muzzle plume (a smaller area plume than for a target) will be detected at an estimated distance longer than 1 km.

Design and Fabricate LC Polarization and Spectral Filters

To construct a spectrometer working in the MWIR band from 3 to 5 μm, oxidized Si was used as the substrates for fabricating the LC filters working in the MWIR. Si crystal has a good flat transmission from 1200 nm to 6500 nm. 1-square-inch uncoated Si substrates was procured from University Wafers Inc. (collegewafers.com) in New Jersey in LC test cells were fabricated, with LC layers 23-μm (with wiring) and 40-μm thick (not yet wired) for specifications and a photo). The fabrication procedure is summarized as follows. First, two substrates are cleaned and spin-coated with polyimide, and are then rubbed to uniformly orient the liquid crystals. The two substrates are assembled with a spacer between them to provide a uniform cavity. The liquid crystal material (doped with or without nanorods) is then fed into the cavity by capillary action. Finally, the openings on the cavity sides are sealed with a UV-curable epoxy to complete the LC cell fabrication.

To address concerns of possible relatively high loss of LC filters based on uncoated Si substrates, some more expensive coated Ge windows were purchased (2-mm thick) from Edmund Optics (edmundoptics.com); two more LC filters (~25-μm thick LC layers) were fabricated as before. Ge also has excellent transmission from 1200 nm up to the LWIR (12 μm). Ge-based LC cells had very good transmission of 80-90% achieved for the 3-6 μm band, also >70% up to the LWIR (11 μm).

A polarimetric imaging spectrometer is constructed by adding a novel LC controllable polarization rotator, a quarter-wave switch, or a linear retarder (QWLR), combined with a half-wave retarder (HWLR) with variable fast axis orientation, right before the commercially available LC spectral filter array. The fast LC-controllable polarization analyzer is constructed from the QWLR, followed by the HWLR, and the horizontal (x-axis) linear polarizer LP (0), which is also the input polarizer of the LC spectral filter. The achromatic quarter-wave switch switches between two states of zero or $\pi/2$ (quarter-wave) phase retardation with the fast axis oriented at 0° (QWLR(0)) or 45° (QWLR($\pi/4$)). The HWLR can have 0° to ±90° polarization rotation, with the fast axis oriented from 0° (HWLR(0)) to ±45° (HWLR(±$\pi/4$)). By multiplying out the Mueller matrices representing the retarders and polarizer, it can be shown easily that the following transformations of the Stokes vector S (s0, s1, s2, s3) correspond to intensity measurements of the six polarization components:

$LP(0)HWLR(0)QWLR(0)S \rightarrow P_H$ $LP(0)HWLR(\pi/4)QWLR(0)S \rightarrow P_V$ $LP(0)HWLR(\pi/8)/QWLR(\pi/4)S \rightarrow P_{45}$ $LP(0)HWLR(-\pi/8)QWLR(\pi/4)S \rightarrow P_{135}$ $LP(0)HWLR(\pi/4)QWLR(\pi/4)S \rightarrow P_R$ $LP(0)HWLR(0)QWLR(\pi/4)S \rightarrow P_L$,   (3-3)

where $P_H$, $P_V$, $P_{135}$, $P_R$, and $P_L$ are the detector's flux measurements for the corresponding incident polarized beams: horizontal linear (0°), vertical linear (90°), 45° linear (45°), 135° linear (135°), right circular, and left circular. The full Stokes vector S can then be directly measured:

$S_0 = P_H + P_V$ $S_1 = P_H - P_V$ $S_2 = P_{45} - P_{135}$ $S_3 = P_R - P_L$.   (3-4)

For each of the six transformations of Eq. (3-3), the LC spectral filter can collect one set of spectral imaging data. All four Stokes components can be measured with spectral and spatial information.

The COTS LC spectral filter array can be procured from Boulder Nonlinear Systems (BNS) in Colorado. This device can be used as spectral imaging optics or programmable spectral filter element. It has 11.4 μm pixels and a center-to-center pixel pitch of 12 μm, resulting in a fill factor of 90%.

This subject invention combines a miniature staring multi-aperture compound eye (fly eye) with a high-speed polarization and spectral selective liquid crystal (LC) filter array, a focal plane array (FPA), and a neural network processor as shown in FIG. 1. The "optics dome" is a virtual dome that is covered with an array of eyelets arranged on a convex surface. Each eyelet uses a small lens to image the scene onto a rigid co-located fiber image guide (coherent fiber bundle). The output ends of the fiber bundles are arranged on a common interface surface, the "fiber interface plate." Most of the fiber bundles are bent to match the convex "input" dome structure. The interface plane is demagnified and imaged onto the detector array via the LC polarization and spectral filter array, by the reimaging lens. By demagnifying the fiber interface plane, the reimaging lens allows more eyelets for a given diameter of fiber bundle, and reduces the effect of fiber diameter on resolution. To obtain a fast update rate, a conventional FPA imager with region of interest (ROI) readout is needed.

A multi-aperture infrared sensor system may be integrated with MWIR nonimaging elements and low-cost, lightweight photodetectors for 3-5 μm, multichannel signal processing electronics, a COTS data acquisition system, control and processing software, and a PC for threat detection and analysis (which includes an algorithm to simulate target tracking, and a neural net). The MWIR source can be detected by the prototype almost instantly, with virtually zero false alarm, triggering an alarm light on the computer screen, and showing the direction of the centroid of the non-stationary object. Such a sensor system can be used herein for polarization and spectral imaging sensing. The sensor is fabricated with integration of the BNS COTS LC polarization and spectral filter array.

An apparatus according to the invention may be assembled in the MWIR band as schematically shown in FIG. 3. This apparatus was assembled to allow the polarization and spectra optics components to operate in the polarization-only, spectral-only modes that are realized by simply moving (manually) the polarization controller or spectral filter (mounted on sliding rails) out of the polarization-spectra dual mode. The three modes can be controlled automatically by the LC electro-optic switching in the polarization controller and/or spectral filter (e.g., polarization-only mode can be achieved by simply turning off the LC switches at the spectral filter part). During the operation, the MWIR imaging target light is detected by the Xenics MWIR FPA sensor. The image signal from the detector is acquired and stored in a laptop computer. The spectral and polarization imaging program coded with MATLAB has been applied to process the imaging (including reading, analyzing, and displaying the image data files).

The Xenics MWIR-InSb-640 camera serves as the MWIR imaging detector for light calibration. The imaging signal from the detector is interfaced with the MATLAB interface on a laptop computer. Polarization and spectra selection is controlled via the LC switches. The multichannel electronic box interfaced with LabVIEW on the PC applies driving voltages (up to ±10 V) to the LC switches, and synchronizes the sensor for acquiring imaging signals. The data processing and interface electronic subsystem is described below.

The genetic algorithm of data processing for the subject invention is analyzed as follows. The process applies five steps:
 1. Operation synchronization
 2. Image collection and processing
 3. Identification and angular determination of moving objects in the scene
 4. Classification of the motion of each object
 5. If appropriate, activating alarms at several levels of perceived danger.

The first three steps can be performed analytically, and the last two as a neural network. To synchronize the operation, a master clock triggers the actuators and sensors in defined intervals. This synchronous operation is essential. For instance, the image captured at the sensor needs to be in synch with each polarization state of the LC polarization controller. The other strong requirement is the labeling of the frames so that, when processing the captured frames, a one-to-one mapping can be performed between the frames and the switching state of the polarization controller.

A one-to-one mapping must be performed between each snapshot and each triggering signal. As the triggering signal is coming from the LC switching controller, a one-to-one mapping can be performed between the snapshots and the LC switching state. Several snapshots should be captured per second, where each snapshot corresponds to a polarization or spectral image of the scene.

To incorporate the required timing for the snapshots for post-processing, a programming interface has been written in C++ which, inter alia, performs the following:
1. Configures the camera. The parameters that can be adjusted are the image resolution, binning, contrast, brightness, etc. An option to upload the configuration file based on the operational mode of the camera can be added.
2. Acts as a triggering mechanism for image acquisition. The program has a user button for acquisition. The software can be programmed so that the image acquisition is in sync with the master clock.
3. Performs timekeeping. To do this, the files are named according to their acquisition timing. For example, when a snapshot of a sample picture is taken, the generated file name that is automatically recorded on the hard drive as "24.06.2013-13.52.01.595.jpg" reflects the time that the snapshot was taken: Jun. 24, 2013, at 13:52:01 and 595 msec. Although this name convention is not an optimal format, it is used to illustrate the programmability of the image capturing system.

Image Collection and Processing.

For data analyses and image processing applications a program based on MATLAB software performs polarization and spectrum analyses and displays for the imaging data obtained.

Identification and Angular Determination of Moving Objects in the Scene.

To implement the desired setup for capturing, camera settings, data interface, and analyses a LabVIEW software suite was used. The spectral/polarization sensor is connected with multi-aperture signal processing electronics interfaced via a data acquisition device. The control interface allows the control of acquisition details such as the sampling rate and number of samples. The data collected from the sensors are displayed on the graphs for the MWIR spectra and each Stokes polarization component of imaging. The alarm of the target detection is displayed using 16 LED indicators for each Stokes component imaging result, arranged according to the sensor layout on the dome for 16 imaging cones (4×4 array, corresponding to a FOV of ~60°×60°). The LED indicator turns from green to red when the sensor voltage passes a specified threshold.

Signal Processing for the Motion Classification and Activating Alarms.

Of importance is the use of spatiotemporal, spectral, and polarization information to discriminate a moving object based on its radiation properties. False positives (false alarms) related, for example, to the appearance within the field of view of the sensor of low temperature but high brightness objects are avoided, as spectral passbands (e.g., sensitivity of PbSe detectors is limited to 5 µm at the longer end) are used. Similarly, motion classified as a near-impact target trajectory would be rejected, as the object (e.g., ground vehicle) temperature is lower than 500 K. This system will recognize the hot plume of an incoming target but will reject a false target related to the hood of a vehicle at 400 K. According to available data, attacks by targets are differentiated from clutter by spectral, polarization, and temporal signatures. Processing these signatures allows us to distinguish/identify the attack. Thus, signal processing needs to:

Distinguish targets from natural motion, noise, etc.
Find the direction and speed of the target approach.
Make a prognostic assessment of the target (time to impact and direction of arrival).

Analysis of these signatures should also consider the polarization and full spectra of emission.

To discriminate targets from the clutter and detect motion, the following requirements were assigned to the processing software:

Processing method must be independent of ambient lighting and time of day,
Sensor elements map to azimuth and elevation by curvilinear transformation,
Because the actual size and speed of moving objects are not available, the processing must:
Find angular spread and angular speed by preprocessing,
Use fuzzy logic rules to determine target status.

The flow chart of the signal processing was split into two corresponding sections, with the first as follows:
Take the sequence of the images with the time frame,
Subtract two consecutive images to identify changes,
Identify regions of significant change
Ambient light change, cloud motion, etc. are too slow to register (changes are below threshold)
For each region of change:
Find the best fit of angular size, aspect ratio, orientation, and angular speed,
Use the fuzzy logic-augmented genetic algorithm (FLAGA),
Transform the sensor coordinates to azimuth and elevation.
Display the result: list of moving objects and attributes.

The second section is responsible for understanding the target and taking action: (1) Filter moving object information; (2) Compare current moving object with time history of each prior moving object→predict and append a trajectory; (3) Raise an alarm if any target is detected—Initiate telemetry to transmit threat bearing; (4) Determine whether each object is a threat by applying fuzzy logic rules to categorize objects (sniper, target, laser, non-threat).

In the hardware for the subject invention, each pixel outputs a signal directly proportional to intensity, while in the described simulations, this analog signal is derived in proportion to how much this particular pixel is filled. Tracking is performed by capturing an initial frame and computing the pixel locations of the peak intensities, then capturing the next frame and computing the location of the brightest intensities. The location of the fastest motion (largest change in pixel intensity) is computed by subtracting the previous image pixel-by-pixel from the current image. This procedure is continuously repeated, and at the end the pixels (angles) for which the fastest change and highest intensities are found are tagged for alarm or requiring immediate action.

It will be understood that the foregoing description is of preferred exemplary embodiments of the invention and that the invention is not limited to the specific forms shown or described herein. Various modifications may be made in the design, arrangement, and type of elements disclosed herein, as well as the steps of making and using the invention without departing from the scope of the invention as expressed in the appended claims.

The invention claimed is:

1. A biomimetic integrated spectral polarimetric imaging system comprising a wide field-of-view multi-aperture compound eye, said compound eye being a hemispherical dome with hexagonal imaging elements, and being coupled to MWIR fiber bundle arrays at an inlet and outlet respectively, wherein the MWIR fiber bundle arrays are chalcogenide glass cored and then integrated to a high-speed, polarized and spectral selective liquid crystal filter array, a MWIR focal plane array, and a neural network processor said hexagonal imaging elements having optimized MWIR light coupling efficiency to the MWIR fiber bundle arrays.

2. The biomimetic integrated spectral polarimetric imaging system of claim 1 wherein the polarization and spectral selective liquid crystal filter array are electro-optic tunable with speed in micro seconds and operating up to 90% transmission in the MWIR 3-5 micron band.

3. The biomimetic integrated spectral polarimetric imaging system of claim 1 having a spectral polarization controller constructed by adding a liquid crystal controllable polarization rotator, a quarter-wave switch, or a quarter-wave linear retarder, combined with a half-wave linear retarder with variable fast axis orientation, right before the commercially available LC spectral filter array.

4. The biomimetic integrated spectral polarimetric imaging system of claim 1 wherein electronic control is performed with neural network signal processing electronics.

5. A biomimetic integrated spectral polarimetric imaging system comprising a wide field-of-view multi-aperture compound eye, said compound eye being coupled to MWIR fiber bundle arrays at an inlet and outlet respectively, and then integrated to a high-speed, polarized and spectral selective liquid crystal filter array, a MWIR focal plane array, and a neural network processor, wherein the polarized and spectral selective liquid crystal filter array are electro-optic tunable with speed in micro seconds and operating up to 90% transmission in the MWIR 3-5 micron band.

6. The biomimetic integrated spectral polarimetric imaging system of claim 5 having a hemispherical dome with hexagonal imaging elements (HIO), said hexagonal imaging elements having optimized MWIR light coupling efficiency to the MWIR bundle arrays.

* * * * *